A. H. & G. D. KELLER.
ALARM FOR AUTOMOBILES.
APPLICATION FILED JAN. 2, 1917.
1,245,239.
Patented Nov. 6, 1917.
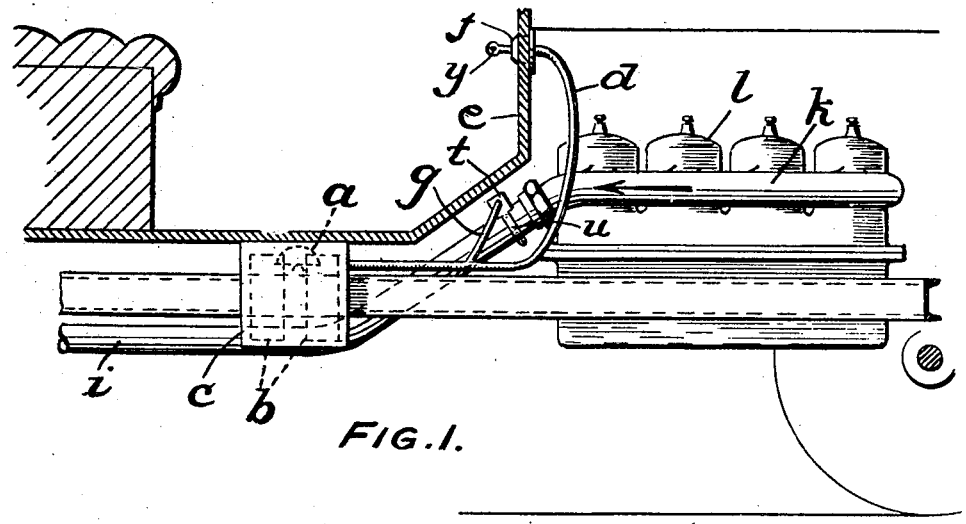
FIG. 1.
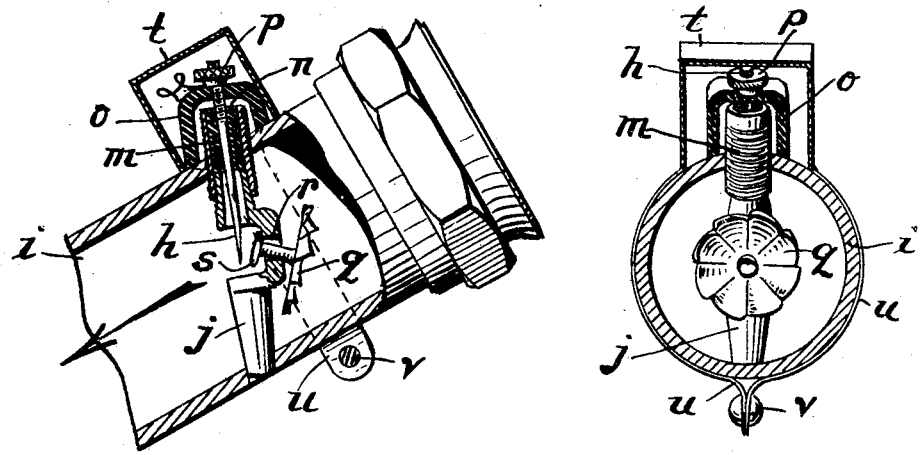
FIG. 2.
FIG. 3.
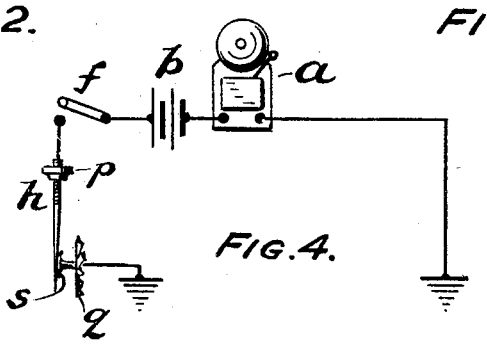
FIG. 4.
WITNESS:
Rob. R. Hitchel.
Inventor.
Augustus H. Keller and
George D. Keller
BY Frank L. Busser
Attorney.

UNITED STATES PATENT OFFICE.

AUGUSTUS H. KELLER AND GEORGE D. KELLER, OF PHILADELPHIA, PENNSYLVANIA, ASSIGNORS TO SAID GEORGE D. KELLER.

ALARM FOR AUTOMOBILES.

1,245,239.

Specification of Letters Patent.

Patented Nov. 6, 1917.

Application filed January 2, 1917. Serial No. 140,294.

*To all whom it may concern:*

Be it known that we, AUGUSTUS H. KELLER and GEORGE D. KELLER, citizens of the United States, residing at Philadelphia, county of Philadelphia, and State of Pennsylvania, have invented a new and useful Improvement in Alarms for Automobiles, of which the following is a full, clear, and exact description, reference being had to the accompanying drawings, which form a part of this specification.

Our invention relates to that class of alarms which has for its object the safety of the automobile from being stolen or otherwise operated in the absence of its owner.

To this end, our invention provides a warning alarm bell in an electric circuit which is normally open and therefore idle, but upon the operation of a switch, preferably a lock switch, said circuit is put into condition to be automatically closed by the starting up of the engine, thus operating the alarm bell, which continues ringing as long as the engine runs.

The bell and all its connections, with the exception of the lock switch, are beneath the floor of the car, and, therefore, out of sight of any possible thief. The lock switch is placed in some convenient place, preferably on the dash board, and insures against the thief's stopping the ringing of the alarm.

The alarm is set off by means of a circuit closing device placed within the exhaust pipe leading from the manifold of the engine. This device is in the circuit of the alarm bell, and normally holds said circuit open. Upon the starting up of the engine, however, the blast of the exhaust acts upon the device to close the circuit. This occurs every time the engine is run, but the alarm is only sounded when the operator closes a switch in the circuit, which he does upon leaving the car.

The advantages of the device are manifest and we will now proceed to describe a form of mechanism embodying our invention, in connection with the accompanying drawings, in which—

Figure 1 represents a portion of an automobile with our alarm installed thereon.

Fig. 2 is an enlarged detail view of the alarm operating device partly broken away.

Fig. 3 is a cross section through same.

Fig. 4 is a diagrammatic view showing the electric circuit.

An alarm bell $a$ and battery $b$ are carried in a container $c$ beneath the floor of the vehicle. A wire from the battery is carried in a pipe $d$ leading from the container $c$ up inside of the hood to the front of the dash board $e$ to one pole of a lock switch $f$. A wire from the other pole of this switch leads back through pipe $d$ a certain distance thence through a branch pipe $g$ to an insulated pin $h$ of the circuit closing device situated in the exhaust pipe $i$.

The circuit closing device comprises a holder $j$ short enough to be entered crosswise in the exhaust pipe $i$. The holder is mounted in the exhaust pipe preferably up near the latter's connection with the manifold $k$ of the engine $l$. This usually brings it at a place where the exhaust pipe is sloping downward.

A hole is drilled in the exhaust pipe vertically or almost vertically from the top downward entirely through said pipe. Holder $j$ is entered in the pipe and placed with its closed end tightly fitting the hole in the lower side of the pipe. The hole in the top of the pipe is reamed out larger and threaded and a cap $m$ is screwed into it. Cap $m$ has also interior threads which engage the threaded upper end of holder $j$, which is also tubular and open.

Cap $m$ carries the pin $h$ rigidly held therein by a form of cement $n$ which is both an electrical non-conductor and non-inflammable. Pin $h$ projects through above the cement where it is threaded, a porcelain cover $o$ is placed over it, fitting the curve of the exhaust pipe, and a nut $p$ screwed on the pin, thus holding the cover tightly in place.

Pin $h$ is thus held in an entirely insulated position and projects downwardly through the tubular end of holder $j$. At this point, the holder has an offset portion loosely carrying a fan-shaped button $q$ in a hole $r$. The hole $r$ is so much larger than the shank of button $q$ that the button normally hangs down at an angle, which holds its rear end *s* against the offset in the holder, and away from contact with pin *h* directly behind it.

When the engine *l* is started and the exhaust therefrom starts to flow from the manifold *k* through the exhaust pipe *i*, it raises the fan-shaped button *q* onto practically a horizontal axis, pressing it backward so its rear end *s* contacts with pin *h*. This grounds this end of the circuit coming through the wire in pipe *g* and which is connected with pin *h* as by clamping it between cover *o* and nut *p*. The other end of the circuit beyond bell *a* being grounded in the container *c* makes the circuit closed when switch *f* is closed, as is readily seen in the wiring diagram shown in Fig. 4.

The blast along the exhaust pipe, caused by the exhaust from the engine, at once raises the fan-shaped end of button *q* as described, at the same giving it a high speed rotary motion, due to the helical shape of the fan blades. This rotating of the button aids in keeping it up in a horizontal axis, and also insures a good contact between its rear end *s* and pin *h*, and prevents the collection of any particles of carbon or other deleterious matter at the point of contact.

The size of holder *j* and of the button *q* is not such as to materially obstruct the passage of the exhaust through pipe *i*.

In order to protect the device from being rendered inoperative by unscrewing nut *p*, or otherwise, a metal box *t* is fitted to the exhaust pipe over cover *o* and nut *p*, and retained in place by integral strips *u* bent around the pipe and clamped tightly thereto by the rivet *v*.

Similarly the wires connecting the lock switch *f* with container *c* and with pin *h* of the circuit closing device are protected from molestation by being inclosed in the pipes *d* and *g*, which are bent in the necessary direction and attached to each other and to the parts they join.

When the owner leaves his car he draws key *y* from his pocket, inserts it in switch *f*, and closes the switch, returning the key to his pocket. Apparently the car is at the mercy of any passerby; but should anyone count upon this fact and attempt to start up the engine to make off with the car, at once the little fan-shaped button *q* springs into action, closes the circuit, and raises an alarm commensurate with the size of bell *a*.

Having now fully described our invention, what we desire to claim and protect by Letters Patent is:

1. An automobile thief alarm comprising an exhaust pipe, an electric circuit, an alarm included in the circuit, and an exhaust operated circuit closing device in the exhaust pipe.

2. An automobile thief alarm comprising an electric circuit open at two points, an alarm in the circuit, an exhaust operated device adapted to close the circuit at one point, and a hand operated switch adapted to close the circuit at the other point, whereby the position of the hand operated switch determines the operation of the alarm upon the starting of the eigine.

3. An automobile thief alarm comprising an exhaust pipe, an electric circuit, an alarm in the circuit, a fan located in the exhaust pipe adapted to close the circuit, a loose bearing in which the fan normally drops into circuit opening position, said fan being operable by the exhaust and thereby moved bodily into position to close the circuit.

4. An automobile thief alarm comprising an exhaust pipe, a holder carried by and extending into the pipe, a pin carried by the holder, an exhaust operated device carried by the holder and normally out of contact with the pin, but adapted to be moved by the exhaust into contact with the pin, and an open alarm circuit one pole of which is connected with the pin and the other pole of which is connected with said device.

5. An automobile thief alarm comprising an exhaust pipe, a holder carried by and extending into the pipe, a pin extending into the holder having an exposed free end within the pipe, a fan, a loose bearing for the fan carried by the holder, said fan normally dropping by gravity in its bearing away from the pin but adapted to be moved by the exhaust into contact with the pin, an alarm circuit opposite poles of which are connected respectively with the fan and with the pin, and a hand-operated switch in the circuit to determine the closure of the circuit upon the movement of the fan into contact with the pin.

In testimony of which invention, we have hereunto set our hands, at Philadelphia, on this 26th day of December, 1916.

AUGUSTUS H. KELLER.
GEORGE D. KELLER.